United States Patent [19]

Perna

[11] 4,414,553

[45] Nov. 8, 1983

[54] INK JET ARRAY

[75] Inventor: Theodore P. Perna, Garland, Tex.

[73] Assignee: Xerox Corporation, Stamford, Conn.

[21] Appl. No.: 364,064

[22] Filed: Mar. 31, 1982

[51] Int. Cl.[3] ........................ G01D 15/18; G01D 9/00

[52] U.S. Cl. ................................ 346/1.1; 346/140 R

[58] Field of Search ........................... 346/1.1, 75, 140

[56] References Cited

U.S. PATENT DOCUMENTS 4,194,211 3/1980 Hoffman et al. ...................... 346/75

4,215,350 7/1980 Mielke et al. ............ 346/140 PD X 4,243,995 1/1981 Wright et al. ................ 346/140 PD 4,356,499 10/1982 Kodama ............................... 346/75

4,358,775 11/1982 Jinnai .................................. 346/75

*Primary Examiner*—Donald A. Griffin

*Attorney, Agent, or Firm*—Richard A. Tomlin

[57] ABSTRACT

A pulsed liquid droplet ejecting apparatus array wherein rectangular piezoelectric transducers are arranged abaxially over ink-containing chambers. An edge of each transducer is fixed in a rigid casing so that on excitation of the transducers, the transducers extend into the ink chamber ejecting a droplet. The array is made by first producing completed individual jets and then assembling the completed jets into an array. The jets are designed to reduce mechanical crosstalk and to efficiently utilize the drive pulse.

1 Claim, 4 Drawing Figures

INK JET ARRAY

The invention relates to a pulsed liquid droplet ejecting apparatus wherein a piezoelectric transducer, for example, is arranged abaxially to an ink channel so that when the transducer is excited, it expands in the direction of the ink channel compressing it and the liquid therein. Specifically, the invention relates to the manufacture of such an array by first producing individual jets and, after testing each jet, assembling the suitably operating jets into an array. The individual jets are designed to efficiently utilize the drive pulse and reduce mechanical crosstalk between the jets in the array.

In a pulsed drop-on-demand liquid droplet ejecting system, such as an ink jet printer, transducers are used to cause expulsion of ink as droplets from a nozzle or jet. An array of such jets is often utilized in high-speed, high resolution printers. As is well known, the rate of printing and the resolution of the printed image depend on the rate of droplet ejection and the number of jets in the array. Typically, a large number of jets are closely spaced in an array. The closer the jets are to one another in general, the faster the images can be produced and with higher image resolution.

One type of ink jet that is well suited for incorporation in such an array is that shown in U.S. Pat. No. 4,243,995, issued Jan. 6, 1981, to Allen T. Wright and Kenneth H. Fischbeck, and assigned to the assignee of this invention. In that arrangement, a rectangular transducer is alligned abaxially to an ink-containing channel. On application of a short electrical voltage drive pulse across the width of the transducer, the transducer expands into the ink-containing channel. Since the ink is incompressible, the transducer movement causes the ejection of a droplet from the ink channel, which, on striking a record-receiving member, forms an ink spot thereon as is well known. An array of such jets suffers from a problem common to drop-on-demand ink jet arrays when the jets are "packed" closely together; that is, the movement of one transducer in response to its drive pulse can be transmitted to neighboring jets affecting the velocity of droplet ejection therefrom or, in the extreme case, causing spurious droplet ejection from unpulsed jets. Such crosstalk can affect the quality of the final image.

Two types of crosstalk are encountered in ink jet array systems. First, there is the transmittal of drive pulse pressure waves through the solid material in which the jets are encapsulated called herein "mechanical crosstalk". Second, there is the transmittal of pressure waves through the common interconnecting liquid ink supply system. This invention is concerned with reducing the first type of interaction or mechanical crosstalk. The jets of this invention are individually formed in rigid casings, which casings act both the reduce mechanical crosstalk between jets and to increase the efficiency of utilization of the drive pulse energy as will be explained further herein.

The invention is described below with reference to the drawing, which shows two preferred embodiments of the present invention.

The Figures are greatly exaggerated in size, and the various spacings, layers and members are not drawn to scale.

Figure 1:
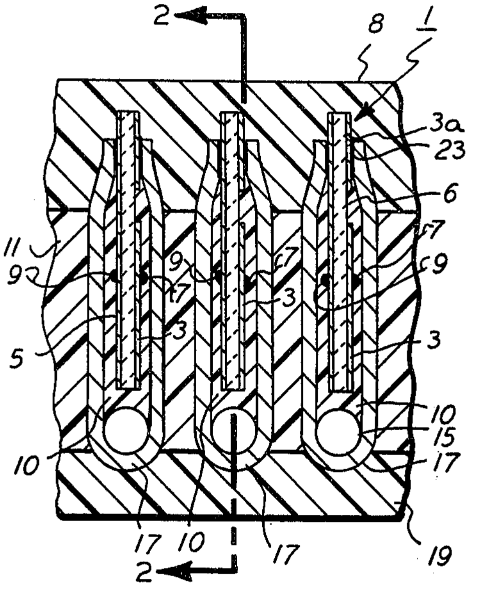
FIG. 1 is a cross-sectional end view of an array showing the use of a preformed sleeve as a rigid casing member.
Figure 2:
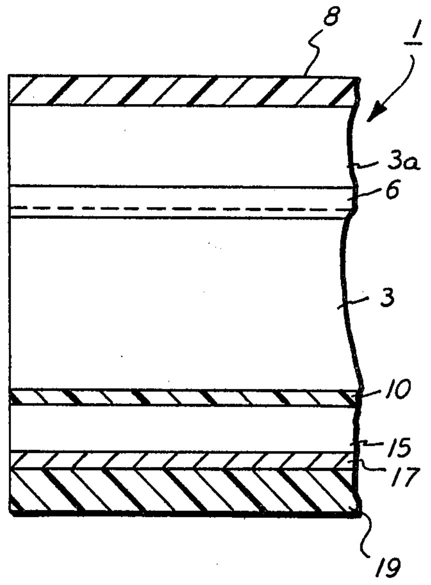
FIG. 2 is a side-sectional view of one of the jets in the array of FIG. 1 taken along line 2—2 in FIG. 1.

Referring now to FIGS. 1 and 2, there is shown a three-jet section of a jet array. A typical array would contain, by way of example, 20 or more such jets. Piezoelectric member generally designated 1 is coated on its sides with conductive electrode materials 3 and 5, with 3 being the active electrode and 5 being the common electrode. A gap 6 in active electrode 3 is provided so that the portion of the electrode 3*a* affixed to the below described rigid casing 17 is not electrically connected to the remainder of electrode 3 for reasons explained further herein. An electrical voltage drive pulse generator (not shown) is connected to active electrode 3 and common electrode 5 by electrical leads 7 and 9, respectively. Piezoelectric member 1 is polarized in the direction from the surface on which common electrode 5 is formed to the surface on which active electrode 3 is formed during manufacture so that application of an electrical field in a direction opposite to the polarization direction causes the piezoelectric member 1 to become thinner as is well known. When this occurs, piezoelectric member 1 expands in height and length as explained in U.S. Pat. No. 4,243,995. since piezoelectric member 1 is held rigidly by casing 17, the expansion in height can only result in the movement of piezoelectric member 1 toward ink channel 15. The movement of piezoelectric member 1 also sets up pressure pulses in the body of the jet, which, if not absorbed or reflected, will be transmitted to neighboring jets causing loss of drive pulse energy and affecting the operation of neighboring jets. To prevent these pressure waves from traveling through the body of the array, the jets are encased in a rigid casing 17, which may be, for example, stainless steel. The rigid casing 17 prevents the passage of pressure waves by minimizing deformation of the casing wall. Ink-containing channel 15 is formed in part by rigid casing 17. Since casing 17 is non-elastic, the drive pulse energy directed into ink channel 15 is more efficiently utilized, there being less chance for energy absorption than would be the case were channel 15 formed of a more elastic or energy absorbing layer. Further, since casing 17 can be made of, for example, stainless steel, the chemical attack of the ink on the channel 15 walls can be minimized.

Figure 4:
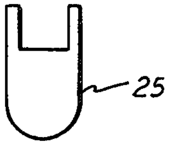
FIG. 4 shows a positioning mandrel which is used in the production of the jets of FIG. 1 but itself forms no part of the completed jet.

To produce an individual jet, piezoelectric member 1, coated on its sides with electrodes 3 and 5, has a portion of electrode 3 removed to form gap 6. This isolates portion 3*a* from the remainder of the active electrode 3. A stainless steel plate rigid casing 17 is bent into a "U" shape, with the upper ends 18 bent towards each other. A positioning mandrel 25 shown in FIG. 4 is placed in the bottom of the "U" to act as a guide for piezoelectric member 1. The top of the piezoelectric member 1 is coated with an adhesive 23 and forced into contact with rigid casing 17 so that adhesive 23 on piezoelectric member 1 forms a bond at its interface with the upper ends 18 of rigid casing 17. The positioning mandrel 25 is then removed. A rod or pin (not shown) is then placed in the bottom of the rigid casing 17 of the size and shape representing ink channel 15. The rigid casing 17 is then filled with an elastomeric layer 10 such as, for example, a urethane, to complete the formation of the individual jet. The rod or pin is then removed forming ink-containing channel 15. The jet can then be tested to determine whether it will operate satisfactorily as a droplet ejector. This is a key feature of this invention. In prior art arrays where the jets were formed in situ, the whole array could be rendered unsatisfactory by the improper manufacture of a single jet.

Gap 6 in active electrode 3 was made so that piezoelectric member 1 would be inactivated at its point of bond 23 with rigid casing 17. This minimizes the movement of piezoelectric member 1 between electrode section 3*a* and the bond 23, which movement could cause physical failure of the bond by, for example, cracking.

To form an array of jets, the individual jets are aligned and bonded first into reaction block 8, which may be, for example, a rigid epoxy material. The array is then completed by encapsulating the remainder of the jets first in a compressible encapsulating material 11, which may be, for example, a polyurethane foam, and then by encapsulation in, for example, a rigid epoxy 19.

By way of example, an ejector is made up of piezoelectric member 1, which may be Piezoceramic PZT-5, available from Vernitron Piezoelectric Division, Bedford, Ohio, which measures 0.25 mm thick by 5 mm high by 15 mm long and is available coated with poled electrodes. The piezoelectric member has a portion of active electrode 3 removed to form section 3*a*. The rigid casing 17 is made of an annealed 300 series stainless steel, the plate measuring about 20 mils in thickness. The plate is bent into a "U" shape over a round pin measuring about 0.031 inch in diameter. The pin is removed. A positioning mandrel 25, as shown in FIG. 4, is placed in the "U" to hold piezoelectric member 1 about 10 mils above the top of the channel 15. The piezoelectric member 1 has a bonding material 23, which, in this exemplary instance, is ABLE Bond 36-2, available from Ablestick Laboratories, coated on its surface where piezoelectric member 1 will contact rigid casing 17. Piezoelectric member 1 is then held in place by the positioning mandrel 25 until the piezoelectric member 1 is bonded to the upper ends 18 of rigid casing 17 by adhesive 23. The positioning mandrel is removed, and the pin is reinserted in the bottom of the rigid casing 17. The piezoelectric member 1 is then potted in rigid casing 17 using CPC-39, a urethane available from Emerson & Cuming, Inc., Canton, Mass. The pin is then removed to leave channel 15. The pin can be tapered to form a nozzle if desired. The individual jets are tested for satisfactory operation by filling the channels with ink and applying a drive pulse to the piezoelectric member. A potential application of about 50 volts at a frequency of about 8 kilohertz can be used by way of example. The velocity and volume of the expelled droplets are observed to determine acceptability. Normally the velocity of droplets expelled from a single jet would not be expected to vary more than ±1096 from the average in the array. The successfully operating individual jets are then held together with alignment spacers leaving the upper ends free to be encapsulated with reaction block 8. Reaction block 8 may be, for example Stycast 1267, an epoxy available from Emerson & Cuming, Inc., Canton, Mass. The alignment spacers are then removed, and the jets encapsulated with Eccofoam FP, a polyurethane, available from Emerson & Cuming, Inc., Canton, Mass. This is a relatively flexible material, which allows for absorption of pressure waves generated by the individual jets, which escape the rigid casing. The array is then encapsulated with Stycast 1267, an epoxy available from Emerson & Cuming, Inc., Canton, Mass., to provide array rigidity.

Figure 3:
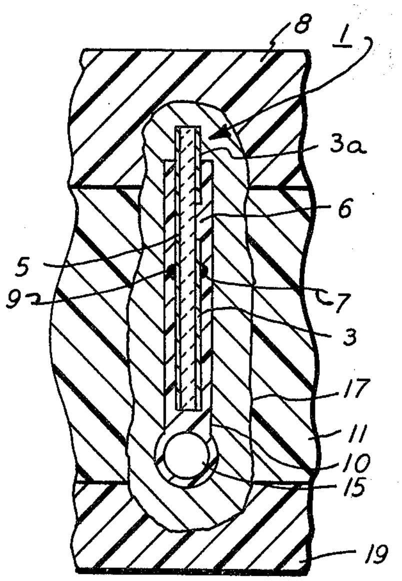
FIG. 3 shows a useful alternative embodiment of the jet wherein the rigid casing is formed in situ by electroforming.

FIG. 3 shows another embodiment of a jet individually manufacturable and also including a rigid casing 17. Here, however, the rigid casing is formed by electroforming. A piezoelectric member 1 having electrodes 3 and 5 thereon is placed in a form with a pin to form ink channel 15, and the assembly is coated as shown with a 0.010 inch thick layer 10 of Silastic X3-6596, an elastomer available from Dow Corning, Midland, Michigan. The purpose of this layer is to act as a shear relief material between piezoelectric member 1 and rigid casing 17 and to transmit the drive pulse movement of piezoelectric member 1 into channel 15. The encapsulated piezoelectric member 1 and elastomeric layer 10 are then coated with an electroformed layer of nickel approximately 0.02 inch thick. This is accomplished by suspending the individual jets in a bath of Barrett Sulfamate nickel plating solution, available from the Richardson Company, Allied Kelite Division. The surface tension of the bath is 30 dynes/cm with a pH of about 4.1. the bath temperature is 50° C. Plating time is about 18 hours at a plating current of about 0.14 amperes. The bath is made the anode. The thus formed individual jets are tested and formed into an array as set forth in connection with the jets of FIG. 1.

Although specific embodiments and components have been described herein, it will be understood by those in the art that various changes in the form and details may be made therein without departing from the spirit and scope of the invention. For example, piezoelectric member 1 could be replaced by an electroresistive or magnetostrictive member 1. Further, rigid casing 17 could be made by die casting, electroplating or using filled epoxies.

What is claimed is:

1. A method of forming a fluid jet array, which comprises:

(a) producing at least two individual jets, each said jet comprising a substantially rectangular transducer and a channel for containing fluid, said transducer being positioned in operating relationship to said channel, and wherein each said transducer and said channel are at least partially enclosed in a rigid casing;

(b) testing each said jet to determine its acceptability as a droplet ejector; and (c) assembling the acceptable jets into an array.

* * * * *

UNITED STATES PATENT AND TRADEMARK OFFICE
CERTIFICATE OF CORRECTION

PATENT NO. : 4,414,553

DATED : November 8, 1983

INVENTOR(S) : Theodore P. Perna

It is certified that error appears in the above-identified patent and that said Letters Patent are hereby corrected as shown below:

Column 3, line 58, change "±1096" to -- ±10% --.

Signed and Sealed this

*Fifteenth* Day of *May 1984*

[SEAL]

*Attest:*

GERALD J. MOSSINGHOFF

*Attesting Officer* — *Commissioner of Patents and Trademarks*